US009195702B2

(12) United States Patent
Bourbonnais et al.

(10) Patent No.: US 9,195,702 B2
(45) Date of Patent: Nov. 24, 2015

(54) MANAGEMENT AND SYNCHRONIZATION OF BATCH WORKLOADS WITH ACTIVE/ACTIVE SITES OLTP WORKLOADS

(71) Applicant: International Business Machines Corporation, Armonk, NY (US)

(72) Inventors: Serge Bourbonnais, Palo Alto, CA (US); Paul M. Cadarette, Hemet, CA (US); Michael G. Fitzpatrick, Raleigh, NC (US); David B. Petersen, Great Falls, VA (US); Gregory W. Vance, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 13/970,686

(22) Filed: Aug. 20, 2013

(65) Prior Publication Data
US 2015/0058281 A1 Feb. 26, 2015

(51) Int. Cl.
*G06F 17/30* (2006.01)
*G06F 9/48* (2006.01)
*H04L 29/08* (2006.01)

(52) U.S. Cl.
CPC ........ *G06F 17/30377* (2013.01); *G06F 9/4856* (2013.01); *H04L 67/1008* (2013.01); *H04L 67/1095* (2013.01)

(58) Field of Classification Search
CPC combination set(s) only.
See application file for complete search history.

(56) References Cited

U.S. PATENT DOCUMENTS

| | | | |
|---|---|---|---|
| 7,260,575 B2 | 8/2007 | Dearing et al. | |
| 7,430,646 B2 | 9/2008 | Cox et al. | |
| 2012/0259968 A1 | 10/2012 | Anaya et al. | |
| 2013/0007503 A1 | 1/2013 | Anaya et al. | |
| 2013/0318221 A1 | 11/2013 | Anaya et al. | |
| 2015/0058864 A1* | 2/2015 | Bourbonnais et al. | ........ 718/105 |
| 2015/0112931 A1 | 4/2015 | Bourbonnais et al. | |
| 2015/0113537 A1 | 4/2015 | Bourbonnais et al. | |

* cited by examiner

*Primary Examiner* — Etienne Leroux
(74) *Attorney, Agent, or Firm* — Patricia B. Feighan; Rahan Uddin

(57) ABSTRACT

A computer system for managing a plurality of workloads executing on both a primary system and on a secondary system, and synchronizing both a plurality of software data and hardware data stored on the primary system with the secondary system is provided. The computer system may include receiving a region switch request and stopping the execution of the plurality of workloads on the primary system; suspending the replication of the plurality of software and hardware data stored on the primary system with the plurality of software and hardware data stored on the secondary system; and switching the replication of the plurality of software data and the plurality of hardware data that occurs from the primary system to the secondary system to occur from the secondary system to the primary system. The computer system may include activating the execution of and synchronizing the plurality of workloads on the secondary system.

12 Claims, 4 Drawing Sheets

US 9,195,702 B2

MANAGEMENT AND SYNCHRONIZATION OF BATCH WORKLOADS WITH ACTIVE/ACTIVE SITES OLTP WORKLOADS

FIELD OF THE INVENTION

The present invention relates generally to the field of workload balancing and more particularly to the management and synchronization of batch workloads with online transaction processing (OLTP) workloads across Active/Active Sites.

BACKGROUND

Active/Active Sites is a network of independent processing systems where each system has access to a replicated database giving each system access and usage of shared multiple workloads. In an Active/Active Sites system all requests are load-balanced across all available processing capacity. Where a failure occurs on a system, another system in the network takes its place. Active/Active Sites (i.e., A/A Sites) are designed to provide continuous availability, disaster recovery and cross-region workload balancing for defined Active/Active Sites workloads. Active/Active Sites workloads are currently limited to routable, online transaction processing (OLTP), applications and their data objects. Online transaction processing (OLTP) workloads are comprised of short transactions that perform business operations across one or more database management system (DBMS). ACID properties are preserved across those DBMS. Batch workloads are long running processes comprised of DBMS transactions that modify large amount of data, and which often use storage outside of the DBMS (e.g., files) to record the progress of the process for recovery purposes.

Batch processing is an execution of a series of programs ("jobs") on a computer without manual intervention. Jobs are set up so they can be run to completion without manual intervention. As such, all input data are preselected through scripts, command-line parameters, or job control language. This is in contrast to "online" or interactive programs which prompt the user for such input. A program utilizes a set of data files as input, processes the data, and produces a set of intermediate and output data files. This operating environment is termed as "batch processing" since the input data are collected into batches of files and are processed in batches by the program. There is currently no Active/Active Sites support for batch workload distribution since batch jobs are typically local to a region. However, since batch workloads can target the same data objects as OLTP workloads, it may be beneficial to consider batch workloads in all planned and unplanned Active/Active Sites workload and/or region switches.

SUMMARY

A method for managing a plurality of workloads executing on both a primary system and on a secondary system, and synchronizing both a plurality of software data and a plurality of hardware data stored on the primary system with the secondary system is provided. The method may include receiving a region switch request and stopping the execution of the plurality of workloads on the primary system; suspending the replication of the plurality of software and hardware data stored on the primary system with the plurality of software and hardware data stored on the secondary system; and switching the replication of the plurality of software data and the plurality of hardware data that occurs from the primary system to the secondary system to occur from the secondary system to the primary system. The method may further include activating the execution of and synchronizing the plurality of workloads on the secondary system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
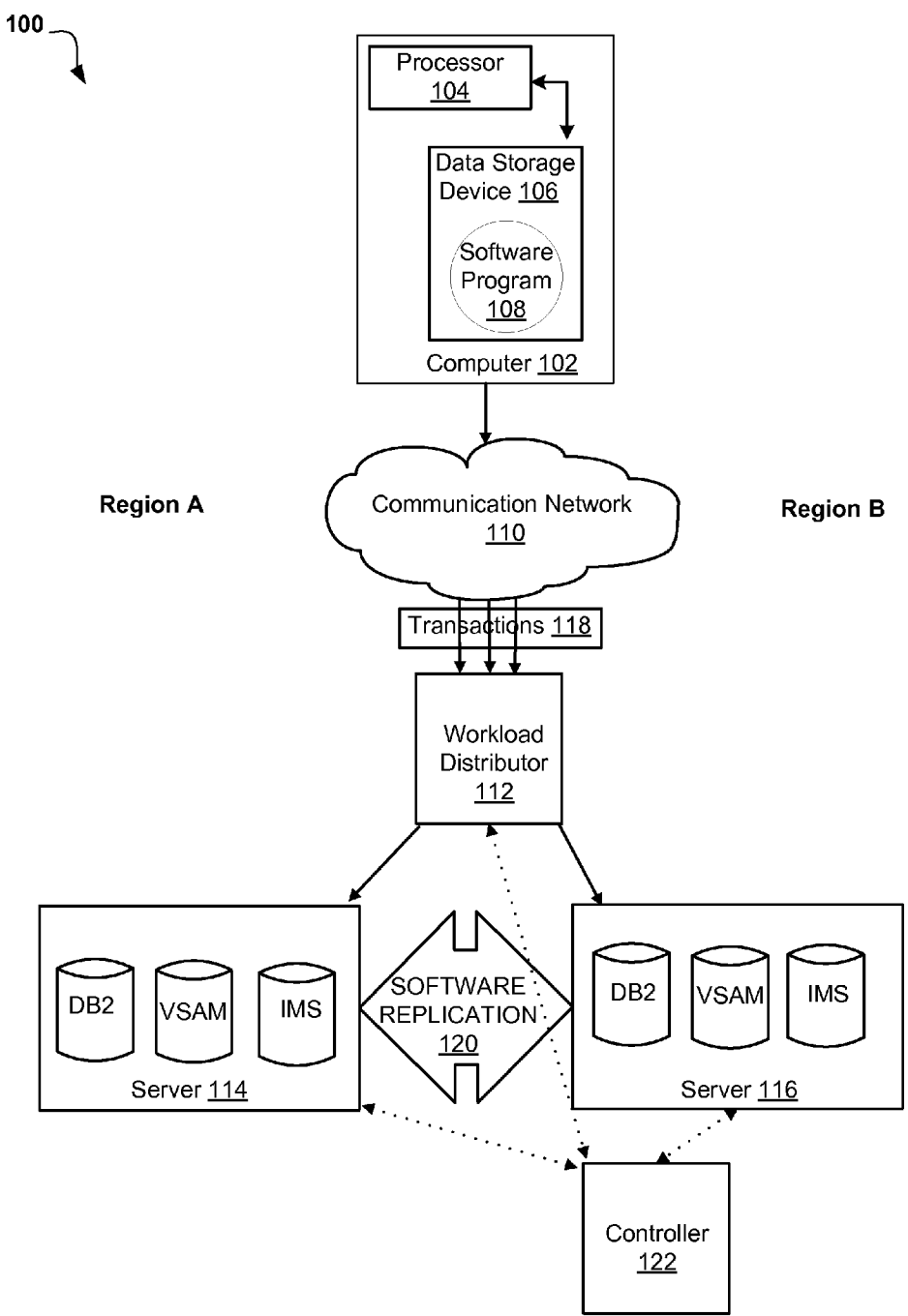
FIG. 1 illustrates the hardware that may be used in a networked computer environment with a failover model to manage and synchronize Active/Active Sites workloads.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of workload balancing and more particularly to management and synchronization of batch workloads with Active/Active Sites OLTP workloads. The following described exemplary embodiments provide a system, method and program product for managing and synchronizing of batch workloads with Active/Active OLTP workloads.

Active/Active Sites (A/A Sites) are designed to provide continuous availability, disaster recovery and cross-region workload balancing. However, workload distribution support is not currently provided for batch jobs since batch jobs are typically local to a region. Furthermore, while Active/Active Sites can currently provide software replication for the data objects targeted by batch jobs, there is no current support for the synchronization of batch artifacts, such as intermediate data files and batch job scheduler states, that are critical for the successful re-processing of interrupted batch jobs during region switches. These intermediate data files are typically sequential, or flat, files. Batch job scheduler states are also typically maintained in flat files as well. The aforementioned flat files are not replicated using the software replication components of Active/Active Sites; however, they are replicated between regions using hardware (disk) replication products for disaster recovery (DR) purposes. Since software replication and hardware replication are managed separately, the Active/Active Sites workload data may be inconsistent in certain use cases. Therefore, there exists a need for providing the management and synchronization of batch workloads with Active/Active OLTP workloads.

According to at least one embodiment of the present invention, batch workloads that are running at the time of a planned, or unplanned, workload or region (i.e., site) switch may be restarted (i.e., resumed at the job step prior to failure) at the alternate region and re-synchronized with OLTP workloads to resolve any data inconsistency.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product for the management and synchronization of batch workloads with Active/Active OLTP workloads. Additionally, embodiments of the present invention may ensure applicable batch workloads that are running at the time of a planned, or unplanned, workload or region switch may be restarted (i.e., resumed at the job step prior to failure) at the alternate region and re-synchronized with OLTP workloads to resolve any data inconsistency.

Referring to FIG. 1, the hardware that may be used in a networked computer environment with a failover model to manage and synchronize Active/Active Sites workloads is depicted. Active/Active Sites (A/A Sites) are designed to provide continuous availability, disaster recovery, and cross-region workload balancing. According to at least one embodiment of the present invention, the current environment of a software data replication (i.e., software replication) as depicted in FIG. 1, is utilized in addition to the utilization of a hardware data replication (i.e., disk replication) which will be explained in detail with respect to FIG. 2 and FIG. 3.

Currently, as depicted in FIG. 1, A/A Sites (including the active/standby configuration) only support A/A Sites workloads. A/A Sites workloads are workloads that support OLTP against DBMS such as, DB2, IMS, and/or VSAM and require the ability to perform planned and unplanned region switches in seconds. In Active/Active Sites, the DBMS are synchronized using software replication. DB2 is a relational model database server developed by IBM; Information Management System (IMS™) is a transaction and hierarchical database manager for critical online applications developed by IBM; and virtual storage access method (VSAM) is an IBM disk file storage access method. Software replication uses DBMS log capture/transaction replay technology for synchronizing the DBMS across regions.

The networked computer environment 100 may include a computer 102 with a processor 104 and a data storage device 106 that is enabled to run a software program 108. The networked computer environment 100 may also include server computers 114 and 116 that are enabled to run Active/Active Sites such as DB2 replication, IMS replication, and/or VSAM replication. The client computer 102 may issue transactions 118 via a communication network 110 to a workload distributor 112. The workload distributor 112 is software and/or hardware that balances the workload distribution and for each transaction, may determine how the workload should be distributed to the regions. As such, the workload distributor 112 may interact with server 114 and 116 as well as controller 122. Server 114 and server 116 may be separated by unlimited distances, running the same applications and having the same data. As such, servers 114 and 116 will replicate with each other to ensure cross-region (or cross-site) workload balancing and continuous availability and disaster recovery.

The networked computer environment 100 may include a plurality of client computers 102 only one of which is shown. The communication network may include various types of communication networks, such as a wide area network (WAN), local area network (LAN), a telecommunication network, a wireless network, a public switched network and/or a satellite network.

The client computer 102 may communicate with workload distributor 112 via the communications network 110. The workload distributor 112 may execute computer instructions for continuous availability across multiple regions or regions at unlimited distances. The one or more workload distributors 112 may operate in any type of environment that is capable of executing a software application. One or more workload distributors 112 may include a high-speed computer processing device, such as a mainframe computer or router, to manage the volume of operations governed by an entity for which a continuous availability across multiple region or sites at unlimited distances process is executing. The one or more workload distributors 112 may be part of an enterprise (e.g., a commercial business) that implements the continuous availability across multiple regions or sites at unlimited distances.

The system depicted in FIG. 1 includes one or more regions such as region A where server 114 resides and region B where server 116 resides. Each of the regions (region A and region B) includes one or more systems executing one or more workloads. The workloads include transaction processing applications, database applications, queue management operations. Each of the regions includes one or more hardware devices, such as servers 114 and 116 and/or software, such as workload distributor 112 for managing and distributing network traffic among the one or more systems.

The system depicted in FIG. 1 additionally includes a software data replication module 120. The replication module 120 replicates data (i.e., software replication) for each of the workloads between region A and region B. The system depicted in FIG. 1 further includes a controller module 122. The one or more controller modules 122 control the operation of various components such as the one or more workload distributors 112 as described in more detail below.

The workload distributors 112 and the regions (region A and region B) may be communicatively coupled via one or more networks 110. The networks 110 may be any type of known network including, but not limited to, a wide area network (WAN), a local area network (LAN), a global network (e.g., Internet), a virtual private network (VPN), an intranet and a telephone network. The networks 110 may be implemented using a wireless network or any kind of physical network implementation known in the art. The regions, such as region A and region B, may be coupled to the one or more workload distributors 112 through multiple networks (e.g., intranet and Internet) so that not all of the regions are coupled to the one or more workload distribution modules 112 through the same network.

In the current environment, transactions 118 may be distributed to one or more of the regions through the one or more workload distributors 112. Additionally, users of various systems executing at the one or more regions, such as region A one and region B, may initiate the transactions 118. Also, in the current environment, transactions 118 may be transmitted from systems outside of the regions, such as computer 102, and the workloads are routed within one or more of the regions by the workload distributor 112.

It will be understood that the execution of continuous availability across multiple regions at unlimited distances system and methods described in FIG. 1 may be implemented as modules in hardware, software executing on general-purpose hardware, or a combination thereof. Although only two regions are depicted in FIG. 1, it will be understood that the number of regions in FIG. 1 is limited for clarity and that, in an embodiment, any number of regions may be implemented. In addition, in embodiments, any geographic distance may separate the regions. Furthermore, although the one or more workload distributor 112 may be depicted as existing in one or more of the regions directly, it will be understood that in an embodiment, the one or more workload distributors 112 may be located outside of the regions.

The communications network 110 may include connections, such as wire, wireless communication links, or fiber optic cables. As will be discussed with reference to FIG. 4, server computers 114, 116 may include internal components 800*a, b* and external components 900*a, b*, respectively, and client computer 102 may include internal components 800*c* and external components 900*c*, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database.

Figure 2:
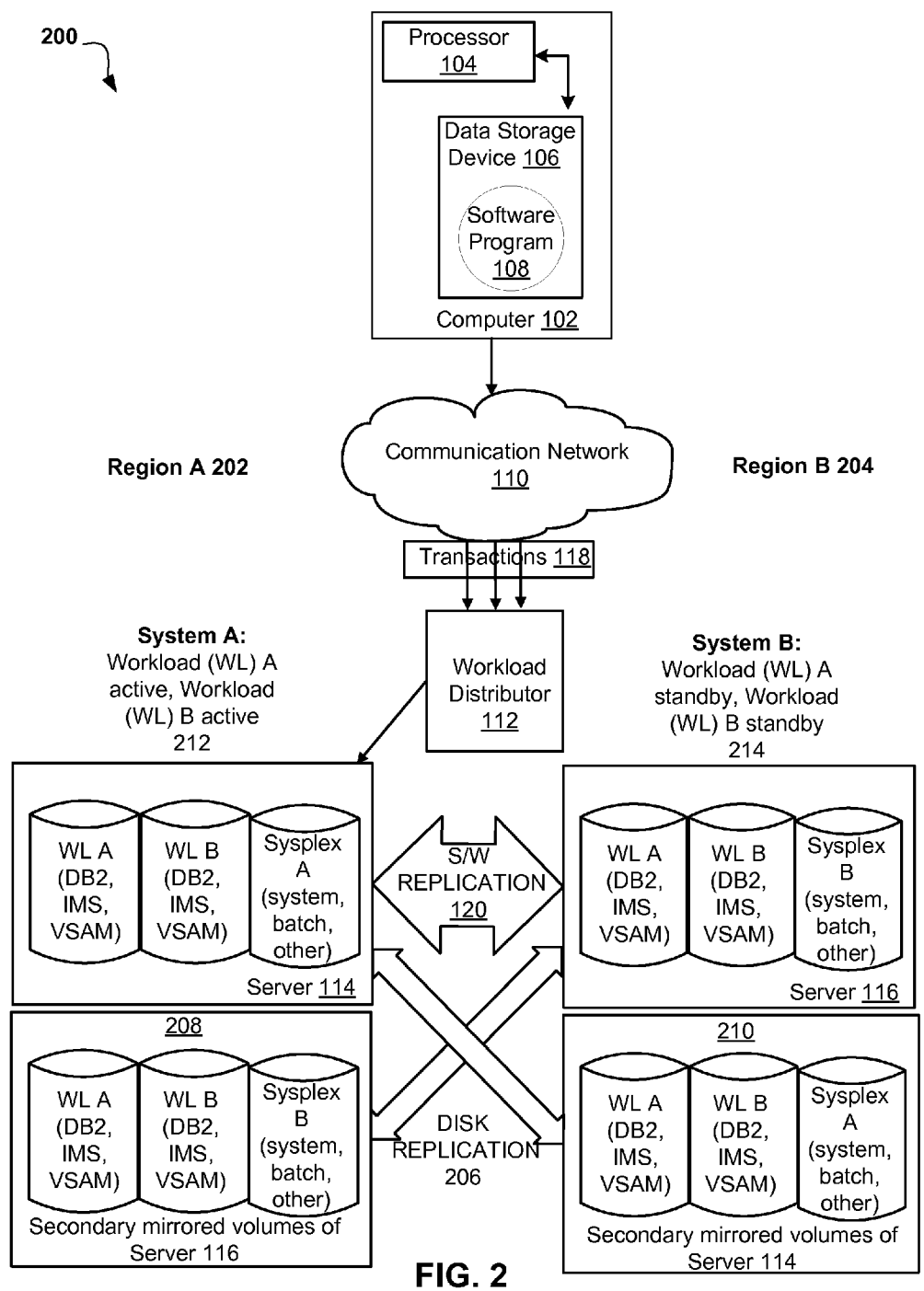
FIG. 2. illustrates the hardware that may be used in a networked computer environment with an exemplary failover model to manage and synchronize batch workloads with Active/Active Sites workloads according to one embodiment.

As previously explained, according to at least one embodiment of the present invention, the current environment of software data replication (i.e., software replication) as depicted in FIG. 1, is utilized. Furthermore, the current environment for A/A Sites as depicted in FIG. 1 supports only A/A Sites, and DBMS, such as DB2, IMS, or VSAM and as such, there is no support for non-A/A Sites workloads, such as batch workloads. The management and synchronization of batch workloads with Active/Active OLTP workloads is described in more detail with respect to FIG. 2 and FIG. 3. It should be appreciated that FIG. 2 provides only an illustration of one implementation and does not imply any limitations with regard to the environments in which different embodiments may be implemented. Many modifications to the depicted environments may be made based on design and implementation requirement.

FIG. 2 illustrates the hardware that may be used in a networked computer environment with an exemplary failover model to manage and synchronize batch non-A/A Sites workload with A/A Sites workload according to one embodiment. As previously stated, at least one embodiment of the present invention utilizes the current replication of software data (i.e., Active/Active Sites workload data) as previously described with respect to FIG. 1 in addition to disk replication of hardware data (i.e., batch non-Active/Active Sites workload data) which will be described with respect to FIG. 2 and FIG. 3. As depicted in FIG. 2, customers may have the ability to deploy both A/A Sites workloads and non-A/A Sites workloads in an A/A Site's two system (i.e., System A 212 and System B 214) configuration. The A/A Site's disk integration support may optionally provide the capability for non-A/A Sites workloads to be managed by A/A Sites and switched between multiple regions. For example, a first site or region (i.e., Region A 202) and a second site or region (i.e., Region B 204) and to restore A/A Sites continuous availability for A/A Sites workloads after a planned or unplanned region switch for all supported configurations.

With respect to FIG. 2, hardware data replication (i.e., disk replication) with software data replication (i.e., software replication) of A/A Sites is deployed across Region A 202 and Region B 204. Although embodiments of the present invention may be implemented on different platforms, IBM System z may be used as one example. Additionally, embodiments of the present invention may be implemented on a single system or on a systems complex. Systems complex (i.e., a sysplex or system) in a mainframe allows authorized components in up to 32 logical partitions (LPARs) to communicate and cooperate with each other using the cross-system coupling facility (XCF) protocol. In mainframes, a cross-system coupling facility (XCF) is a component of z/OS that manages communications between applications in a sysplex or system. Parallel sysplex (also referred to as a system) is a cluster of mainframes acting together as a single system image with z/OS. Used for disaster recovery, parallel sysplex combines data sharing and parallel computing to allow a cluster of systems to share a workload for high performance and high availability. Geographically dispersed parallel sysplex (GDPS) is an extension of parallel system of mainframes located, potentially, in different cities, Sites or regions. GDPS includes configurations for single region or multiple region configurations. Peer to peer remote copy (PPRC) is a protocol to replicate a storage volume to another control unit in a remote region. Synchronous PPRC causes each write to the primary volume to be performed to the secondary as well and the I/O is only considered complete when update to both primary and secondary have completed.

GDPS/PPRC is based on synchronous data mirroring technology (PPRC) that may be used on mainframes that are a limited distance apart. In a two-system model, both regions may be administered as if they were one system. In the event of a failure of a system or storage device, recovery can occur with limited or no data loss automatically.

For example, in FIG. 2, a primary system, such as, System A 212 may reside in Region A 202 (either in Region A/Region 1 if a single region system or GDPS/PPRC or across Region A/Region 1 and Region A/Region 2 if a multi-region system or GDPS/PPRC). A secondary system, such as, System B 214, may reside in Region B 204 (either in region B/Region 1 if a single region system or GDPS/PPRC or across Region B/Region 1 and Region B/Region 2 if a multi-region system or GDPS/PPRC). There may be two A/A Sites workloads, Workload A and Workload B, in the active/standby configuration with the active instances of the workloads executing on System A 212 in Region A 202 and the standby instances of the workload executing on System B 214 in Region B 204. Additionally, there may be non-A/A Sites workloads executing on System A 212 and/or System B 214, such as system or batch workloads.

Software replication 120, such as DB2 Q-replication, may keep the A/A Sites workload's data almost in synch across System A 212 and System B 214. Hardware replication (i.e., disk replication 206) may mirror all the data (i.e., the A/A Sites workload data and non-A/A Sites workload data) from Region A 202 to Region B 204 for System A 212 and from Region B 204 to Region A 202 for System B 214. According to at least one embodiment of the present invention, disk replication 206 may be symmetric; however, it is not required. For example, the data for System A 212 in Region A 202 may be disk replicated but the data for System B 214 in Region B 204 may not be replicated. Furthermore, according to at least one embodiment of the present invention, the disk replication may be between Region A 202 and Region B 204; however, the data may be replicated to another region. For example, data may be disk replicated from Region A 202 to Region C (not depicted). However, for example purposes only, a symmetric disk configuration for System A 212 and System B 214 and disk replication 206 between Region A 202 and Region B 204 may be assumed.

According to one embodiment of the present invention, when there is a request for a planned region or workload switch for System A 212, GDPS/A-A may perform the following: A/A Sites workloads may switch from using the active instances of a workload (i.e., server 114) on System A 212 in Region A 202 to the standby instance of a workload 210 on System B 214 in Region B 204. The switch may be initiated by an operator by clicking on a "route" button or initiating a region switch script on the GDPS/A-A GUI. This switch may typically take approximately one minute.

Non-A/A Sites workloads, which may be optional, may provide the capability to restart System A 212 and its associated workload off the secondary mirrored volumes 210 in Region B 214. The GDPS script capability may be used to provide this capability. The script may be initiated by the operator. The script may stop System A 212 and its associated workload (i.e., server 114) in Region A 202, reverse disk replication 206 from Region A 202 to Region B 204 to Region B 204 to Region A 202, and restart System A 212 and its associated workloads 210 in Region B 204. The System A 212 restart may typically take approximately one hour. Additionally, when System A 212 is restarted in Region B 204, the former active workload instances of active/standby and/or active/query configurations (i.e., running on server 114) are restarted and become the standby instances of the workloads.

Similar processing may take place for a planned or unplanned region switch for System B 214.

In another embodiment of the present invention, when there is request for an unplanned region or workload switch for System A 212, GDPS/A-A may perform the following: A/A Sites workloads may switch from using the active instances of a workload (i.e., server 114) on System A 212 in Region A 202 to the standby instance of a workload 210 on System B 214 in Region B 204. The switch may be automatic or may require operator authorization based upon policy. The switch may typically take approximately one minute.

Non-A/A Sites workloads, which may be optional, may provide the capability to restart System A 212 and its associated workload (i.e., server 114) off the secondary mirrored volumes 210 in Region B 204. GDPS/A-A for A/A Sites workloads may provide the ability to automatically or manually, based upon policy, to perform unplanned region switches and comparable support for non-A/A Sites workloads. The GDPS script may be used to provide this capability. If the new policy specifies automatic, a predefined non-A/A Sites unplanned region switch script may automatically be initiated and if it specifies prompt, an operator prompt may be issued requesting authorization. Alternatively, an administrator may manually initiate the unplanned non-A/A Sites region switch script. The switch script may restart System A 212 and its associated workloads 210 in Region B 204. The System A 212 restart may typically take approximately one hour. Additionally, when System A 212 is restarted in Region B 204, the former active workload instances of active/standby and/or active/query configurations (i.e., running on server 114) are restarted and become the standby instances of the workloads. Similar processing may take place for a planned or unplanned region switch for System B 214.

Examples of the supported use cases that involve management of the disk replication environment using GDPS/A-A interfaces may include the following:

1. Initialization—Initialization of disk replication in an A/A Sites environment.
2. Planned region switch and go home—Switch the A/A Sites and non-A/A Sites workloads on System A to Region B for a planned event, such as maintenance in Region A, and then switch the workloads on System A back to Region A following the planned event.
3. Unplanned region switch and go home—Switch A/A Sites and non-A/A Sites workloads on System A to Region B for an unplanned outage of Region A, and then switch the workloads on System A back to Region A when it becomes available.
4. Region switch test—Test the ability to bring up System A in Region B and run test workloads there. Live production continues in System A in Region A during the region switch test operation.
5. Disk replication suspend and resync—Suspend disk replication for a planned event, such as disk maintenance in Region B, and then resync disk replication after the event. Resyncing disk replication for this use case also applies to resyncing disk replication after an unplanned suspend event.
6. Tear Down—Bring down disk replication in an A/A Sites environment.

Figure 3:
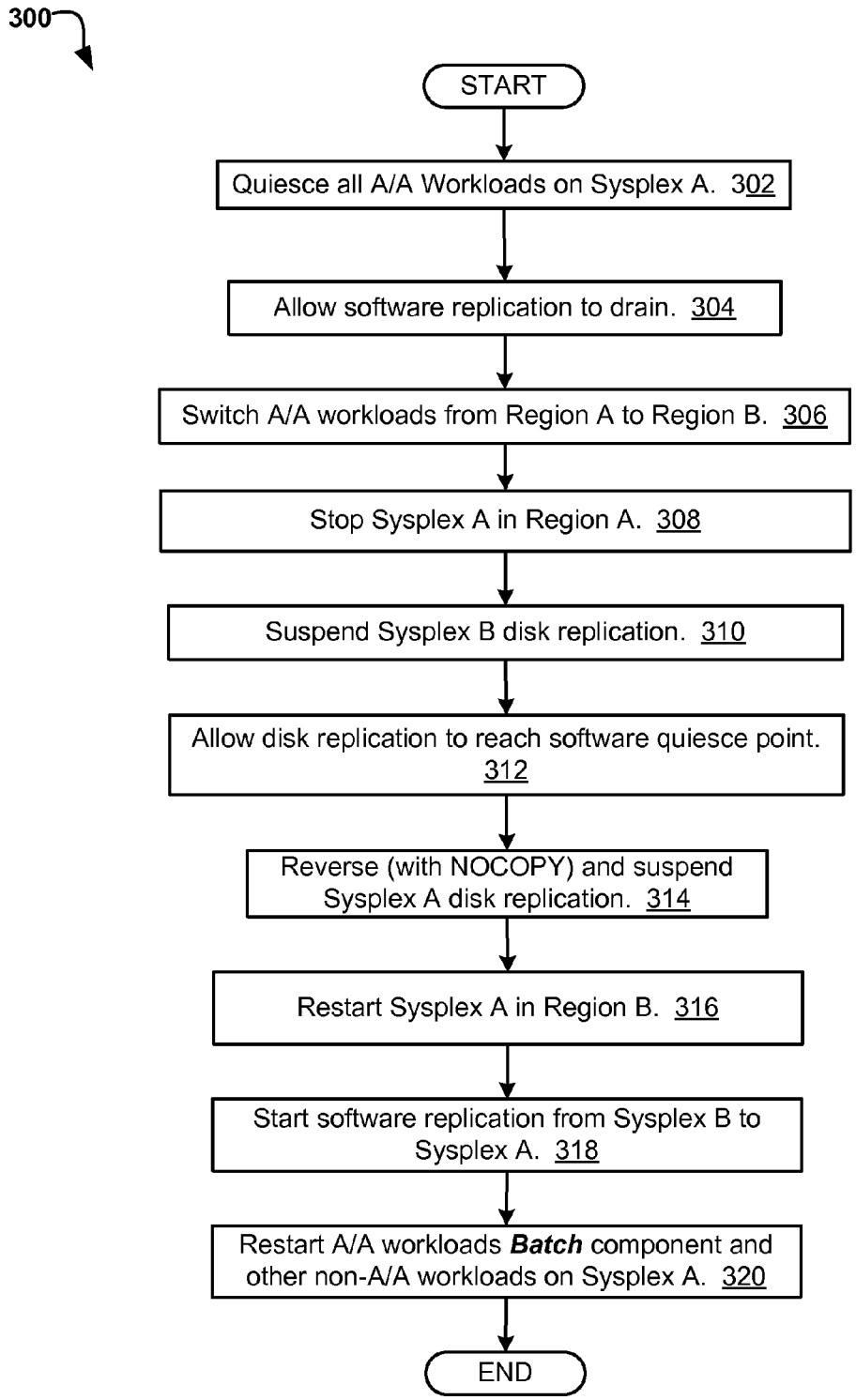
FIG. 3 is an operational flowchart illustrating the steps to synchronize the restart of A/A Sites managed OLTP workloads with batch workloads following a planned or unplanned region switch according to one embodiment.

Referring now to FIG. 3, an operational flowchart illustrating the steps to synchronize the restart of A/A Sites managed OLTP workloads with batch workloads following a planned or unplanned region switch operation for System A (i.e., the primary system). This may be an example of a typical planned maintenance outage. The Region Switch Use Case illustrates the new capability to re-synchronize the data replicated using software data and hardware data replication, now managed together by Active/Active Sites, allowing the batch job to be successfully restarted at the recovery region. FIG. 3 may be explained with the aide of FIG. 2.

At 302, all A/A Sites workloads on System A are quiesced (i.e., will not accept new work). For example, all the OLTP transactions (i.e., the workloads) 118 (FIG. 2) coming in to System A 212 (FIG. 2) are tapered off and eventually disabled. After quiescing the incoming transactions to System A 212 (FIG. 2), the software replication pipe is drained at 304. As such, the outstanding transactions are processed. This may be a combination of sending the incoming transactions 118 (FIG. 2) to the workload distributor 112 (FIG. 2) (i.e., the router that sits in front) as well as to a backend database. Therefore, the in flight transactions are drained in the database systems themselves (i.e., processed) in a managed way.

Then at 306, the A/A Sites workloads are switched from Region A 202 (FIG. 2) to Region B 204 (FIG. 2). For example, there may be an actual switch of the OLTP workloads from server 114 (FIG. 2) in Region A 202 (FIG. 2) to server 116 (FIG. 2) in Region B 204 (FIG. 2). Next, at 308, System A 212 (FIG. 2) is stopped in Region A 202 (FIG. 2) and at 310, System B 214 (FIG. 2) replication in Region A 202 (FIG. 2) is suspended. Therefore, during this time, there is no disk replication 206 (FIG. 2) from System B 214 (FIG. 2) in Region B 204 (FIG. 2) back to Region A 202 (FIG. 2).

At 312, the disk replication is allowed to reach a quiesce point. In other words, A (e.g. 114 (FIG. 2)) that sits in Region A 202 (FIG. 2) and the copy of A (e.g. 210 (FIG. 2)) that resides in Region B (i.e., "A Prime") are in synch. For example with respect to FIG. 2, both the original server 114 residing in Region A 202 (FIG. 2) and the secondary mirrored volumes of server 114 (210) residing in Region B 204 (FIG. 2) would be in synch.

At 314, the System A 212 (FIG. 2) disk replication is suspended and reversed (i.e., switched) with no copy. "A Prime" (i.e., 210 (FIG. 2) which is an identical clone of "A") is physically located in Region B 214 (FIG. 2) now and may become the primary. Therefore, at 316, System A 212 (FIG. 2) is restarted in Region B 204 (FIG. 2). A prime copy of System A 212 (FIG. 2) in Region B 204 (FIG. 2) (i.e., a batch copy of System A 212 (FIG. 2) in Region B 204 (FIG. 2)) is now started and the original System A 212 (FIG. 2) in Region A 202 (FIG. 2) is still suspended.

Next, at 318, the software replication 120 (FIG. 2) from System B 214 (FIG. 2) to System A 212 (FIG. 2) is started. In other words, all the OLTP traffic in System A 212 (FIG. 2) of Region B 204 (FIG. 2) and System B 214 (FIG. 2) of Region B 204 (FIG. 2) is handled in Region B 204 (FIG. 2). The original active/standby pairing between Region A 202 (FIG. 2) System A 212 (FIG. 2) and Region B 204 (FIG. 2) System B 204 (FIG. 2) is now wholly contained in Region B 204 (FIG. 2). As such, at 320, the A/A Sites workloads batch component and other non-A/A Sites workloads on System A 212 (FIG. 2) are restarted and therefore, ready to receive batch workload requests.

The following may be a sample script that may be used to execute a planned region switch operation for System A:

```
COMM 'Switch all workloads to Region B'
ROUTING       'STOP        WORKLOAD=ALL
   REGION=SYSTEM_A' (includes graceful switch exten-
   sions)
ROUTING       'START       WORKLOAD=ALL
   REGION=SYSTEM_B'
SYSTEM 'STOP REGION=SYSTEM_A'
DISKREPLICATION 'SUSPEND SYSTEM=SYSTEM_B'
```

DISKREPLICATION 'SWITCH SYSTEM=SYSTEM_A PLANNED'
DISKREPLICATION 'SUSPEND SYSTEM=SYSTEM_A'
IPLTYPE 'AASYS11 ABNORMAL'—get info for AASYS11 to be brought up in its alternate location
SYSTEM 'ACTIVATE AASYS11 LPAR'—Activate the LPAR for AASYS11
SYSTEM 'LOAD AASYS11'—Initiate the IPL for AASYS11
IPLTYPE 'AASYS12 ABNORMAL'—get info for AASYS12 to be brought up in its normal location
SYSTEM 'ACTIVATE AASYS12 LPAR'—Activate the LPAR for AASYS12
SYSTEM 'LOAD AASYS12'—Initiate the IPL for AASYS12
SYSTEM 'START WORKLOAD=ALL REGION=SYSTEM_A'
REPLICATION 'START WORKLOAD=ALL FROM=SYSTEM_B TO=SYSTEM_A'
REPLICATION 'START WORKLOAD=ALL FROM=SYSTEM_A TO=SYSTEM_B'
ASSIST 'RESTART BATCH WORKLOAD'

Similarly, in an unplanned or disastrous outage in Region A, a customer may be able to restart their batch jobs from the point in time the batch jobs left off before the disaster occurred. The restart may occur as soon as one hour from the time of the unplanned outage which is a significantly shorter timeframe than the existing state of the art method which cannot guarantee recovery at all.

Figure 4:
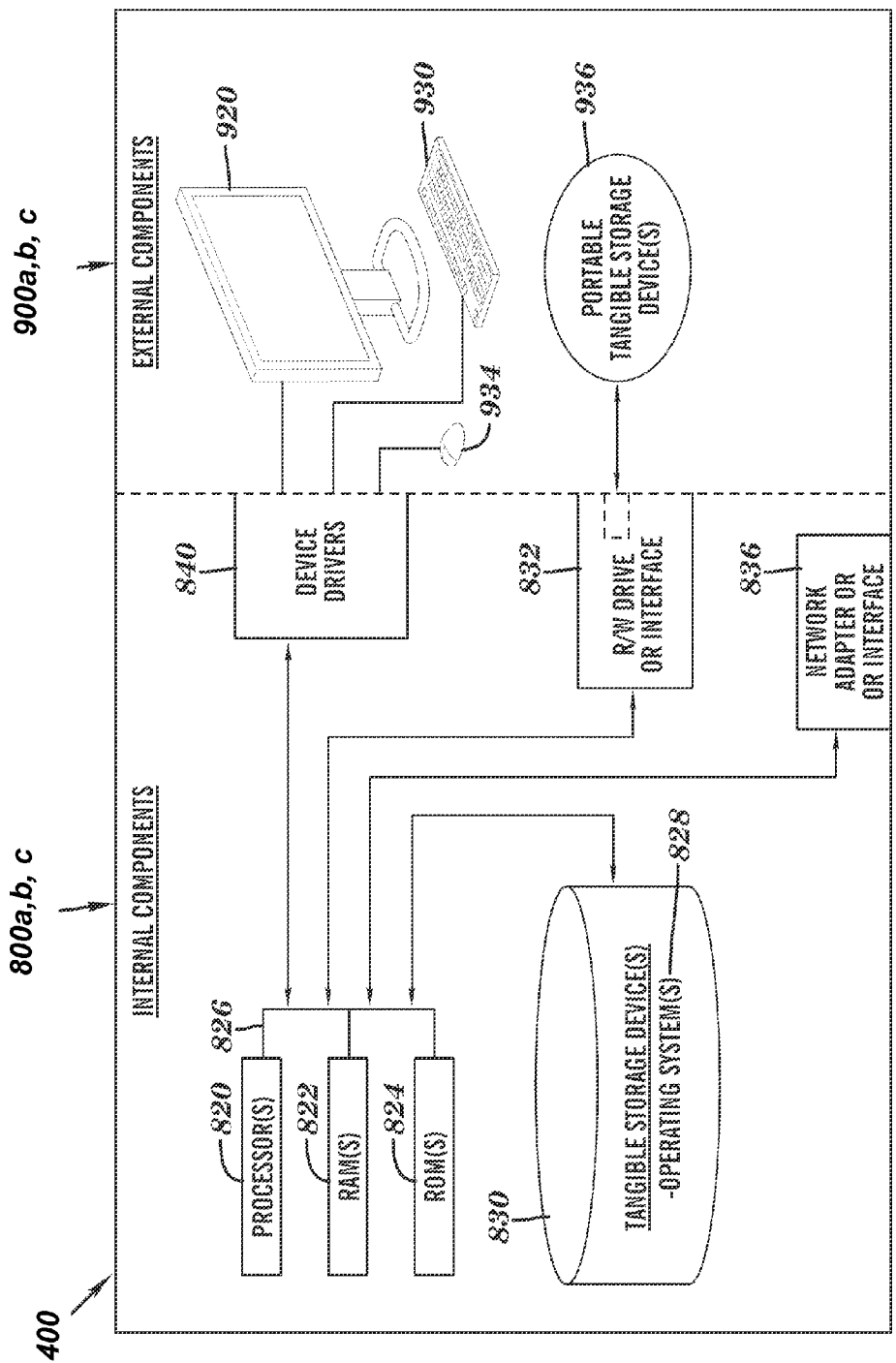
FIG. 4 is a block diagram of internal and external components of computers and servers depicted in FIG. 1.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Workload balancing program 300 may be implemented on an electronic device such as user client computer 102 (FIG. 1) and network server computers 114 and 116 (FIG. 1). User client computer 102 (FIG. 1), and network server computers 114 (FIG. 1) may include respective sets of internal components 800 a, b, c and external components 900 a, b, c illustrated in FIG. 4. Each of the sets of internal components 800 a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 can be stored on one or more of the respective portable computer-readable tangible storage devices 936, read via the respective R/W drive or interface 832 and loaded into the respective hard drive 830.

Each set of internal components 800 a, b, c also includes network adapters or interfaces 836 such as a TCP/IP adapter cards, wireless wi-fi interface cards, or 3G or 4G wireless interface cards or other wired or wireless communication links. A software program 108 in client computer 102 can be downloaded to client computer 102 from an external computer via a network (for example, the Internet, a local area network or other, wide area network) and respective network adapters or interfaces 836. From the network adapters or interfaces 836, the software program 108 in client computer 102 is loaded into the respective hard drive 830. The network may comprise copper wires, optical fibers, wireless transmission, routers, firewalls, switches, gateway computers and/or edge servers.

Each of the sets of external components 900 a, b, c can include a computer display monitor 920, a keyboard 930, and a computer mouse 934. External components 900 a, b, c can also include touch screens, virtual keyboards, touch pads, pointing devices, and other human interface devices. Each of the sets of internal components 800 a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing a plurality of workloads executing on both a primary system and on a secondary system, and synchronizing both a plurality of software data and a plurality of hardware data stored on the primary system with the secondary system, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   receiving a type of region switch request;
   stopping the execution of the plurality of workloads on the primary system based on the type of region switch request;
   suspending, following the stopping of the execution, the replication of the plurality of software data stored on the primary system with the plurality of software data stored on the secondary system;
   suspending, following the stopping of the execution, the replication of the plurality of hardware data stored on the primary system with the plurality of hardware data stored on the secondary system;
   switching the replication of the plurality of software data that occurs from the primary system to the secondary system to occur from the secondary system to the primary system;
   switching the replication of the plurality of hardware data that occurs from the primary system to the secondary system to occur from the secondary system to the primary system;
   activating the execution of the plurality of workloads on the secondary system based on the switching of the replication of both the plurality of hardware data and the plurality of software data; and
   synchronizing the plurality of workloads on the secondary system based on the switching of the replication of both the plurality of hardware data and the plurality of software data;
   wherein the primary system is located at a first region and the secondary system is located at a second region.

2. The computer system of claim 1, wherein the plurality of software data comprises a plurality of Active/Active Sites workload data on both the primary and the secondary system.

3. The computer system of claim 1, wherein the plurality of hardware data comprises the plurality of batch non-Active/Active Sites workload data.

4. The computer system of claim 1, wherein the plurality of workloads comprises a plurality of Active/Active Sites workloads and a plurality of batch non-Active/Active Sites workloads.

5. The computer system of claim 1, wherein the replication of the plurality of software data comprises a synching of the plurality of Active/Active Sites workload data located on the primary system with the plurality of Active/Active Sites workload data located on the secondary system.

6. The computer system of claim 1, wherein the replication of the plurality of hardware data comprises a synching of the plurality of batch non-Active/Active Sites workload data located on the primary system with the plurality of batch non-Active/Active Sites workload data located on the secondary system.

7. The computer system of claim 1, wherein the type of region request comprises at least one of a planned workload switch, a planned region switch, an unplanned workload switch and an unplanned region switch.

8. The computer system of claim 1, wherein the synchronizing of the plurality of workloads comprises a re-synchronization of a plurality of Active/Active Sites workloads and a plurality of batch non-Active/Active Sites workloads.

9. A computer program product for managing a plurality of workloads executing on both a primary system and on a secondary system, and synchronizing both a plurality of software data and a plurality of hardware data stored on the primary system with the secondary system, the program instructions comprising:
   one or more computer-readable tangible storage devices and program instructions stored on at least one of the one or more tangible storage devices, the program instructions executable by a processor, the program instructions comprising:
   program instructions to receive a type of region switch request;
   program instructions to stop the execution of the plurality of workloads on the primary system based on the type of region switch request;
   program instructions to suspend, following the stopping of the execution, the replication of the plurality of software data stored on the primary system with the plurality of software data stored on the secondary system;
   program instructions to suspend, following the stopping of the execution, the replication of the plurality of hardware data stored on the primary system with the plurality of hardware data stored on the secondary system;
   program instructions to switch the replication of the plurality of software data that occurs from the primary system to the secondary system to occur from the secondary system to the primary system;
   program instructions to switch the replication of the plurality of hardware data that occurs from the primary system to the secondary system to occur from the secondary system to the primary system;
   program instructions to activate the execution of the plurality of workloads on the secondary system based on the switching of the replication of both the plurality of hardware data and the plurality of software data; and
   program instructions to synchronize the plurality of workloads on the secondary system based on the switching of the replication of both the plurality of hardware data and the plurality of software data;
   wherein the primary system is located at a first region and the secondary system is located at a second region.

10. The computer program product of claim 9, wherein the plurality of software data comprises a plurality of Active/Active Sites workload data on both the primary and the secondary system.

11. The computer program product of claim 9, wherein the plurality of hardware data comprises the plurality of batch non-Active/Active Sites workload data.

12. The computer program product of claim 9, wherein the synchronizing of the plurality of workloads comprises a re-synchronization of a plurality of Active/Active Sites workloads and a plurality of batch non-Active/Active Sites workloads.

* * * * *